United States Patent [19]
Spragg et al.

[11] 3,720,818
[45] March 13, 1973

[54] METHOD OF MEASUREMENT AND APPARATUS THEREFOR

[75] Inventors: Robert Claude Spragg; David John Whitehouse, both of Leicester, England

[73] Assignee: The Rank Organization Limited, London, England

[22] Filed: Jan. 29, 1971

[21] Appl. No.: 111,070

[30] Foreign Application Priority Data

Jan. 30, 1970 Great Britain...................4,581/70

[52] U.S. Cl. ............235/151.32, 73/105, 235/151.3
[51] Int. Cl. ..............................................G01b 7/34
[58] Field of Search.........235/151.32, 151.13, 151.3, 235/151.35, 184; 73/105; 324/77 A

[56] References Cited

UNITED STATES PATENTS

| | | | |
|---|---|---|---|
| 3,112,642 | 12/1963 | Harmon et al. | 73/105 |
| 3,123,999 | 3/1964 | Judd | 73/105 |
| 3,580,062 | 5/1971 | Perthen et al. | 73/105 |
| 3,544,744 | 12/1970 | Peklenik | 73/105 X |
| 3,313,149 | 4/1967 | Spragg | 73/105 |

Primary Examiner—Malcolm A. Morrison
Assistant Examiner—Edward J. Wise
Attorney—Holcombe, Wetherill & Brisebois

[57] ABSTRACT

Apparatus and method for determining a parameter which will effectively characterize the fluctuations of a dependent variable with respect to an independent variable, such as the height of a surface profile with respect to position along the surface. The apparatus includes means for detecting the variations of the independent variable such as a transducer for detecting the variations of the height of the surface profile along a line in the surface to obtain a signal representing the said variations, and means for differentiating the signal representing the said variations to provide a rate signal depending on the rate of change of the profile height, and means for combining the two signals, such as by integrating each and then dividing one by the other, to provide the said parameter which characterizes the fluctuations.

52 Claims, 8 Drawing Figures

Signal Amplitude y.

Square of Signal Amplitude y²

Signal Slope Amplitude ẏ

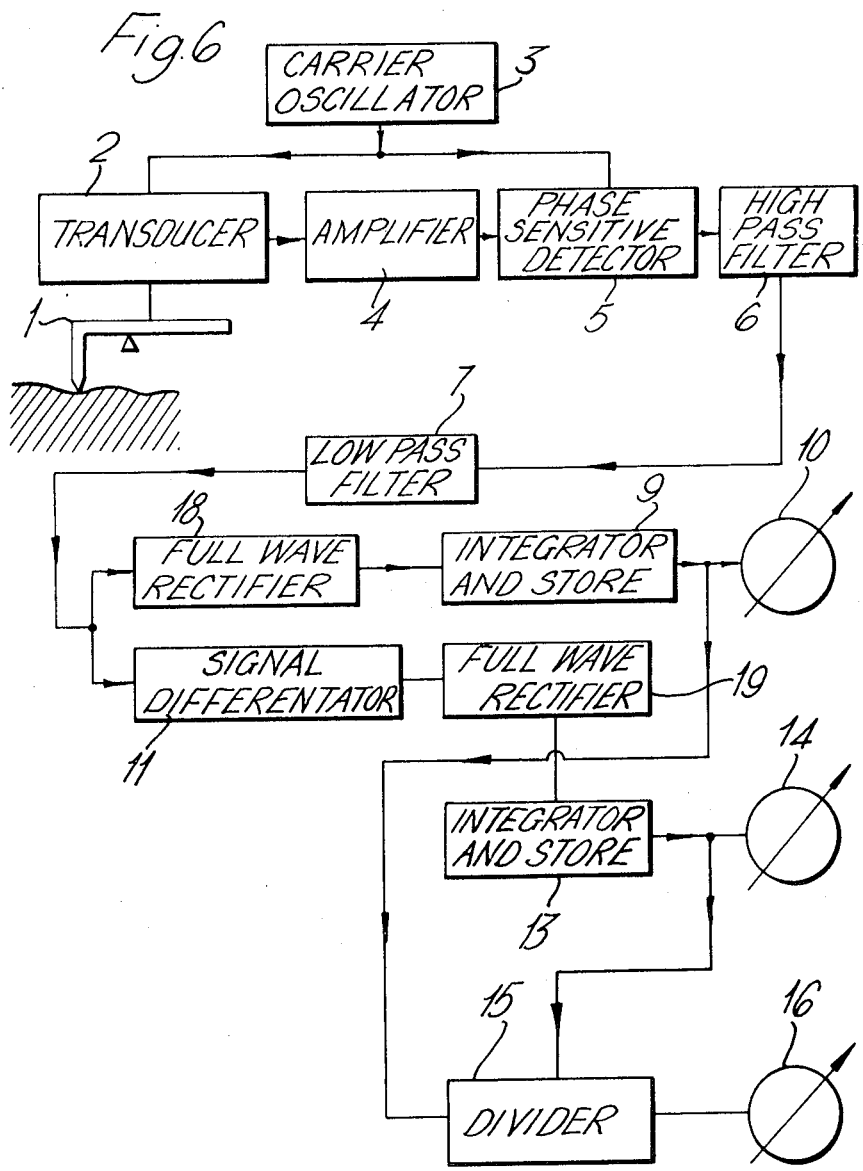

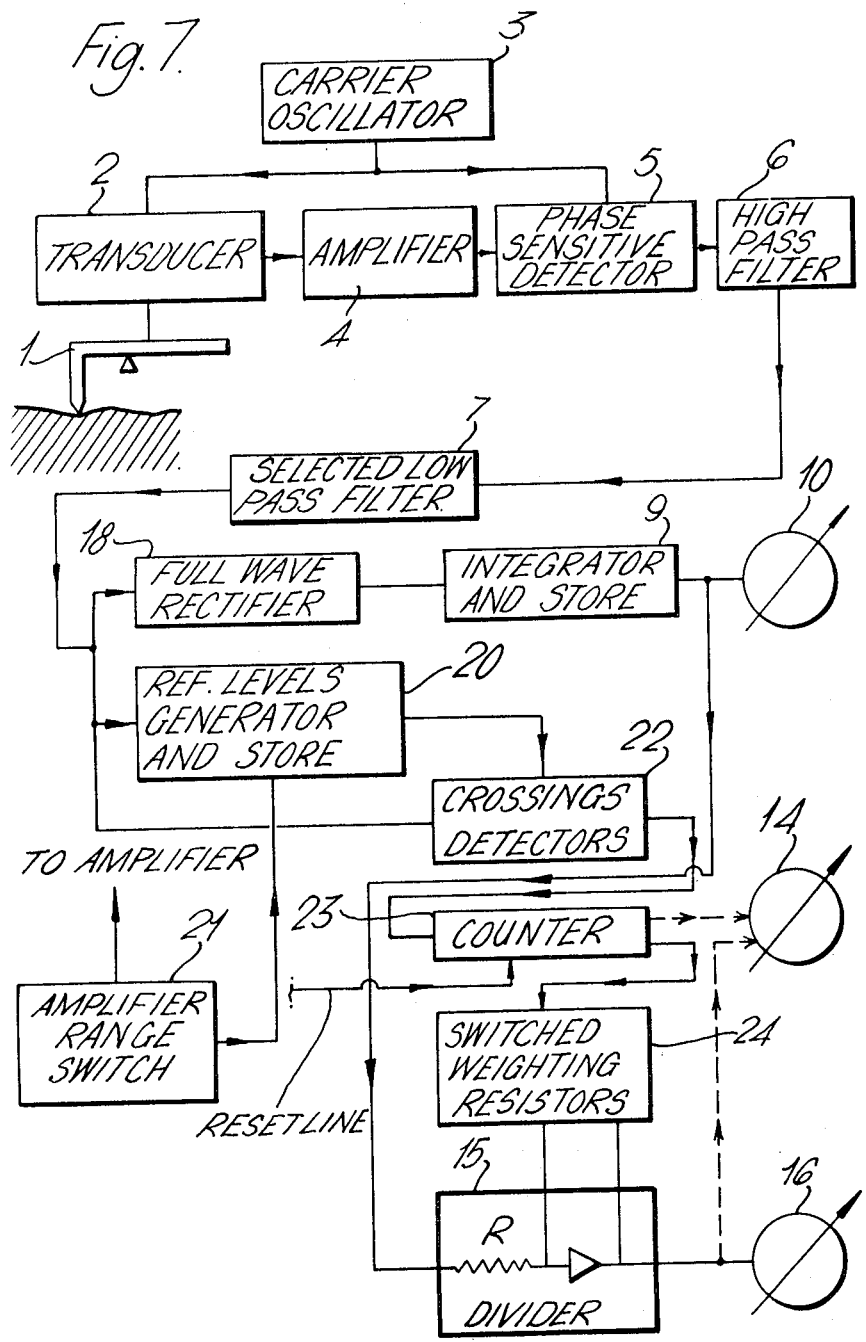

METHOD OF MEASUREMENT AND APPARATUS THEREFOR

This invention relates to methods of testing the interrelationship of a dependent variable and an independent variable and apparatus therefor.

Such a method of testing is particularly applicable to the control or improvement of manufacture.

When any investigation is carried out, the results are frequently obtained as a series of values of a dependent variable corresponding to given values of an independent variable. They may be presented as a graphical display or a tabular presentation of the magnitude of the dependent variable for constant increments of the independent variable. For example, such a display might show the profile of a surface along a line in a chosen direction; alternatively the variation of the temperature of a body with the passage of time might be shown. The data obtained often show cyclic variations or fluctuate in a random manner. Commonly the data exhibit a combination of these two.

In order to make comparisons between different sets of data it is convenient to subject them to some form of statistical analysis. One technique which is frequently employed is to carry out an averaging process and to express the result as a mean value. In the investigation of the profile of a surface, a mean value which finds wide application is the "center line average" which is the arithmetic mean of the amplitude of the profile ordinates when measured from a predetermined reference line.

Although such a mean value may be readily derived using simple instrumentation and does find wide application for comparison of surface of a similar nature, it is subject to severe limitations from the point of view of engineering control, since it is in no way dependent on the rate of change of the dependent variable with respect to the independent variable, being merely a function of the distribution of the magnitude of the dependent variable.

For more complete characterization of the dependence of one variable on another it is desirable to specify in some statistical way the distribution of the normalized rate of change of the variable. It has now become generally recognized that the auto-correlation function of the variables provides such a criterion. The auto-correlation function $\phi(\tau)$ of the fuction $f(t)$ is defined by the relationship $$\phi(\tau) = \underset{T \to \infty}{\text{Limit}} \left[ \frac{1}{T} \int_0^T f(t) \cdot f(t+\tau) dt \right]$$

Unfortunately, however this cannot readily be obtained from low cost instruments and it is necessary to search further for a parameter for providing the desired characterization.

As a result of investigation into the nature of various surfaces, it has been found that the normalized root mean square moment of the power spectrum of the components of spatial frequency of the profile of a surface in respect of its frequency weight is given by the ratio of the root mean square magnitude of the profile gradient to the root mean square value of the height. Further it has been found that the normalized root mean square moment of the power spectrum is given approximately by the ratio of other mean magnitudes of the profile gradient, such as the mean modulus magnitude to the corresponding mean height value.

As is well known, the relation of the power spectrum to the autocorrelation function is one of inverse Fourier transforms. Furthermore, the root mean square moment of the power spectrum can be shown to be related to the autocorrelation function as the second derivative of $\phi(\tau)$ for $\tau = 0$, that is, as expressing the initial decay of the function.

Expressed mathematically, where L is the assessment length, $x$ is the independent variable, that is distance in the direction of measurement, $w$ is a measure of spatial frequency, $f(x)$ is the profile height of the surface normal to the direction of movement of the stylus:

$$\frac{\lambda_{rms}}{2\pi} = \sqrt{\frac{\frac{1}{2\pi}\int_0^\infty P(w)dw}{\frac{1}{2\pi}\int_0^\infty w^2 P(w)dw}} = \sqrt{\frac{[\Phi(\tau)]_{\tau=0}}{\left[\frac{d^2\Phi(\tau)}{d\tau^2}\right]_{\tau=0}}}$$

$$\simeq \sqrt{\frac{\frac{1}{L}\int_0^L (f(x))^2 dx}{\frac{1}{L}\int_0^L \left(\frac{d}{dx}f(x)\right)^2 dx}}$$

$$\frac{\lambda_a}{2\pi} = \sqrt{\frac{\frac{1}{L}\int_0^L (f(x))^2 dx}{\frac{1}{L}\int_0^L \left(\frac{d}{dx}f(x)\right)^2 dx}} \simeq \frac{\frac{1}{L}\int_0^L |f(x)|dx}{\frac{1}{L}\int_0^L \left|\frac{df(x)}{dx}\right|dx}$$

It can be shown mathematically that $$\sqrt{\frac{\frac{1}{L}\int_0^L (f(x))^2 dx}{\frac{1}{L}\int_0^L \frac{d}{dx}f(x)^2 dx}} = \sqrt{\frac{\overline{(f(x))^2}}{\overline{\left(\frac{d}{dx}f(x)\right)^2}}} \sqrt{\frac{\overline{|f(x)|}}{\overline{\left|\frac{d}{dx}f(x)\right|}}}$$

which indicates that $\lambda_{rms} \simeq \lambda_a$ ——.

It has been found that these expressions provide the indices $\lambda rms$ and $\lambda a$ designated the "root mean square wavelength index" and "average wavelength index" respectively, either of which represents, together with the corresponding mean magnitude, a consistent characterization of, in the case of surface texture measurement, roughness, waviness and error of form (features of surface topography having different characteristic spatial frequency) components and in the case of other interdependent variables in other fields of measurement, a means of providing a simple characterization of spectra. Reference in this specification to an "average wavelength index" as herein defined will be understood, therefore to relate to an index of the form:

$$\frac{\lambda a}{2\pi} x = \frac{\overline{|f(x)|}}{\left|\frac{d}{dx}f(x)\right|}$$

Similarly, reference in this specification to a "root mean square wavelength index" as herein defined will be understood to relate to an index of the form $$\lambda_{rms} = 2\pi \sqrt{\frac{\overline{(f(x))^2}}{\overline{\left(\frac{d}{dx}f(x)\right)^2}}}$$

Since the mean magnitude of a variable quantity and the mean magnitude of the rate of variation of one variable with another may each be readily determined independently, a useful criterion for testing and characterizing the relationships of interdependent variables can be specified.

Accordingly the present invention provides a method of characterizing the spectrum of a dependent variable with respect to an independent variable comprising the steps of determining the value of the dependent variable over a range of values of the independent variable, deriving a first signal representing the mean magnitude of the dependent variable over the said range, deriving a second signal representing the mean magnitude of the rate of change of the dependent variable with respect to the independent variable over the said range and modifying one of the signals by means of the other to provide a parameter characterizing the said spectrum.

Preferably, one signal is divided by the other to derive the said parameter.

In one embodiment the signal representing the mean magnitude of the rate of change of the dependent variable over the said range is derived from a signal representing the value of the rate of change of the dependent variable which is derived by differentiation of a signal representing the value of the dependent variable over the said range.

Preferably the parameter is the average wavelength index as herein defined and the two signals are combined by dividing the signal representing the mean magnitude of the rate of change of the dependent variable over the said range into the signal representing the mean magnitude of the dependent variable over the said range.

Particularly, the parameter to be determined characterizes the profile of a surface of a body, the dependent variable being the distance of the surface of the body from a reference line and the independent variable being distance along the surface from a predetermined point.

Preferably the signal representing the value of the dependent variable is obtained by passing a probe in contact with the surface along a predetermined line to obtain a signal representing the distance of the surface from a reference line.

According to another aspect of the invention apparatus for characterizing the spectrum of a dependent variable with respect to an independent variable comprises means for determining the value of the dependent variable over a range of values of the independent variable, means for providing a first signal representing the mean magnitude of the dependent variable over the said range, means for providing a second signal representing the mean magnitude of the rate of change of the dependent variable with respect to the independent variable over the said range, and means for modifying one of the signals by means of the other to provide a signal representing a parameter characterizing the said spectrum.

Various embodiments of the invention will now be more particularly described, by way of example, with reference to the accompanying drawings, in which:

FIG. 6 is a block diagram of an alternative embodiment of a system for the measurement of the average wavelength index of the profile of a surface;

FIG. 7 is a block diagram of a further alternative embodiment of an average wavelength index determining instrument.

Figure 1:
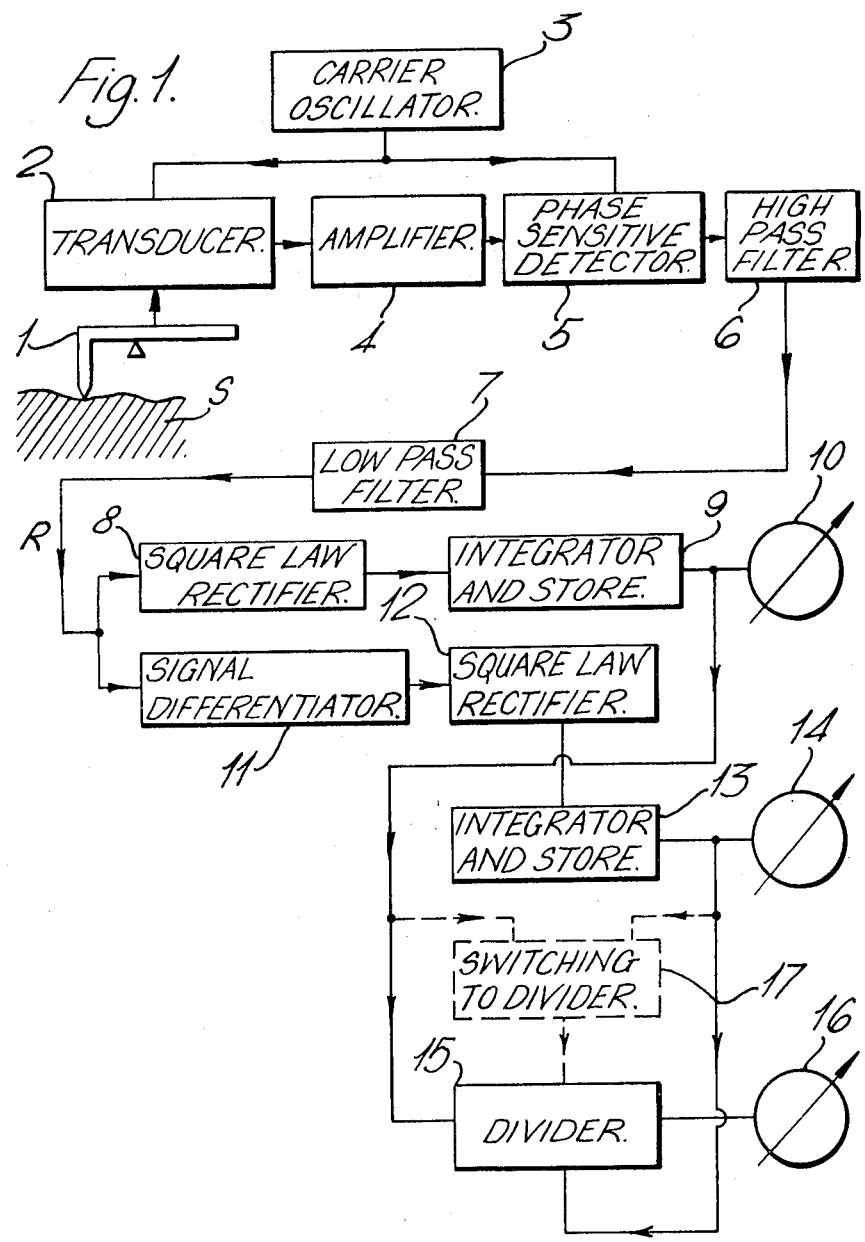
FIG. 1 is a block diagram illustrating the elements of an instrument system for the measurement of the average wavelength index of the profile of a surface.

Referring now to FIG. 1 of the drawings a stylus arm 1 bears a stylus in contact with a test surface S. The other arm of the stylus carries a soft ferro-magnetic armature which is movable so as to vary differentially the inductances of two symmetrical coils constituting a transducer 2. The stylus mount and transducer are constrained for translational movement substantially parallel to the test surface, the stylus tip following the profile of the asperities on the surface.

Movements of the stylus tip normal to the surface create changes of inductance in the transducer coils. The coils are connected in a differential circuit arrangement and are fed with a sine wave signal from a carrier oscillator 3. The output signals from the coils depend on the varying inductance and are combined to produce a carrier signal with balanced or double modulation.

The signals are amplified by an amplifier 4 and demodulated in a phase sensitive detector 5 to produce a signal which is a direct analogue of the surface profile traced by the stylus tip. The profile signal at this stage contains components due to offset (a mean DC level determined by the absolute position of the stylus tip), error of form (departure of the surface from true form) and waviness (periodic undulations) as well as roughness (the micro-texture it is desired to investigate). The unwanted components are all substantially removed by passing the signal through a high pass filter 6 whose turn-over frequency is chosen appropriately.

Figure 2:
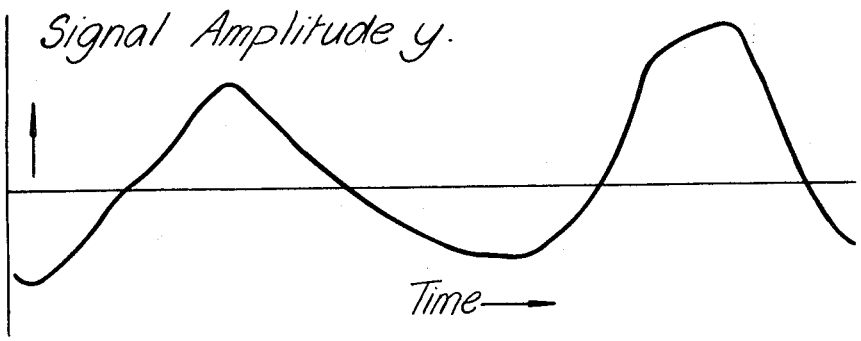
FIG. 2 is a representation of a typical roughness signal produced by part of the instrument of FIG. 1.

The signal emerging from the high pass filter is represented in FIG. 2. It is an analogue of the surface roughness profile and consists only of AC components which may be derived as Fourier components by performing transformation on the roughness signal.

For reasons which will be explained later the profile signal is passed through a low-pass filter 7 having a turnover frequency approximately 6 octaves above that of the high pass filter 6. It is then rectified in a square law rectifier 8, integrated over a complete traverse of the stylus and stored in a memory device 9. The amplitude of the stored and integrated signal may be displayed on an indicator 10, which, if it has a square law characteristic will indicate the root mean square of the profile amplitude.

Figure 4:
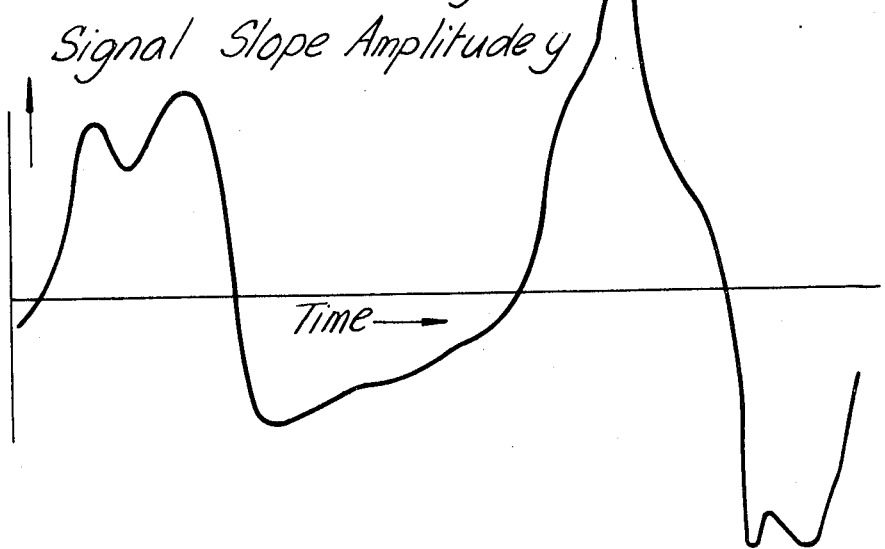
FIG. 4 is a representation of a signal produced by passing the signal of FIG. 2 through a differentiating circuit.

The roughness signal from the low pass filter 7 is also fed to a differentiator circuit 11 and then to a square law rectifier 12. The differentiated profile signal is illustrated in FIG. 4. The rectified signal is passed to an integrator and store 13 and the resulting integral may be displayed as a mean square or root mean square value by an indicator 14.

The integrated signals from stores 9 and 13 are fed respectively to the divisor and divider inputs of a divider circuit 15 and the output fed to an indicator 16 having a square law characteristic and displayed as the spacing index of the surface profile.

A square root process is conveniently incorporated if the divider circuit is of the logarithmic generators type comprising two input logarithmic generators, a subtractor circuit, and an output anti-logarithmic generator. The square root process is then simply incorporated by inserting a gain of ½ either in or after the subtractor circuit according to the well known relation:

$$M/N = \text{antilog} \left[ \tfrac{1}{2} (\log M^2 - \log N_2) \right]$$

Incorporation of the square root process enables a linear characteristic display device to be used.

A further advantage may be derived from such a logarithmic divider which can convert the scales for indicating root mean square amplitude and root mean square slope to a linear law. By means of switches, 17, the stored signals from integrators 9 and 13 may, when required, be switched as divisors to the logarithmic divider circuit. As the circuit permits the derivation of square roots the divider input is simultaneously switched to unit value for indication of either root mean square amplitude or root mean square slope.

FIG. 6 is a block diagram of an instrument system for the measurement of the average wavelength of a roughness profile. This system closely resembles that of FIG. 1 but differs in principle by the substitution of mean modulus parameters for root mean square parameters. The system of FIG. 6 produces a value of average wavelength close to that produced by the system of FIG. 1 on account of the relation:

$$\frac{\overline{[f(x)]^2}}{\left[\overline{\frac{df(x)}{dx}}\right]^2} = \sqrt{\frac{\overline{|f(x)|}}{\left|\overline{\frac{df(x)}{dx}}\right|}}$$

which is an approximate one but usefully accurate.

Figure 3:
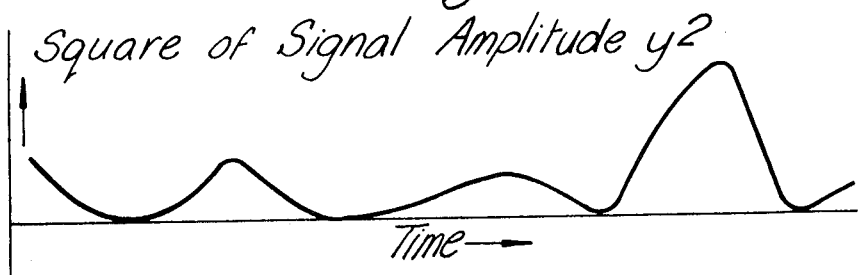
FIG. 3 is a representation of a signal produced by passing the signal of FIG. 2 through a square law rectifier.
Figure 5:
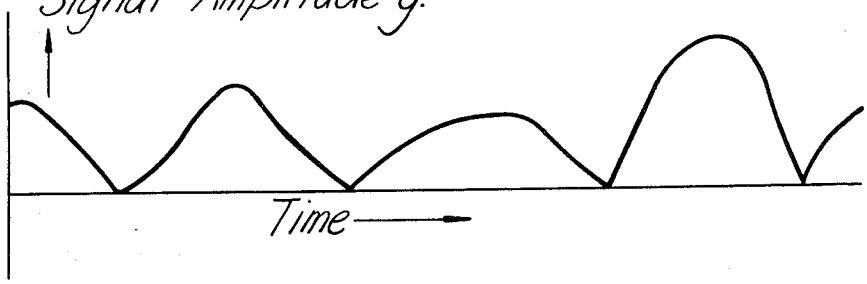
FIG. 5 is a representation of the signal produced by passing the signal of FIG. 2 through a full-wave rectifier.

The mean modulus amplitude, $\overline{|f(x)|}$ results from integrating $f(x)$ over the assessment traverse and adding ordinate values of $f(x)$ irrespective of whether these ordinates are positive or negative with respect to a zero datum. The square law rectifier 8 of FIG. 1 is replaced by a full wave rectifier 18 in the arrangement shown in FIG. 6. The output waveform of the full wave rectifier circuit when fed with the profile signal of FIG. 2 is illustrated in FIG. 5. The waveform of FIG. 5 shows the negative portions of the waveform appearing inverted as positive portions and the signal otherwise unchanged. A reversed inversion may be chosen. Comparison with the square law rectified waveform of FIG. 3 shows a similar inversion of negative portions, but the square law effects the waveform generally, large amplitude portions becoming "peaky" and low amplitude portions "compressed".

Likewise the mean modulus of the slope $\overline{|df(x)/dx|}$ may be employed instead of the mean square by replacement of the square law rectifier, 12 of FIG. 1 by the full wave rectifier 19 in FIG. 6. For the system of FIG. 6 neither square law scales nor the alternative of square root extraction are required for readouts on the meters 10, 14, 16. Only linear scales and a straightforward dividing operation are required in the design of items 10, 14, 16 and 15.

An alternative form of apparatus more compatible with digital techniques may be used to derive the average wavelength from the ratio of the mean amplitude of the profile and the mean modulus of the slope.

The slope of a line is defined as the differential of its amplitude and, to a first approximation is proportional to the number of predetermined increments $\Delta f(x)$ of the amplitude per increment of distance $\Delta x$.

Figure 8:
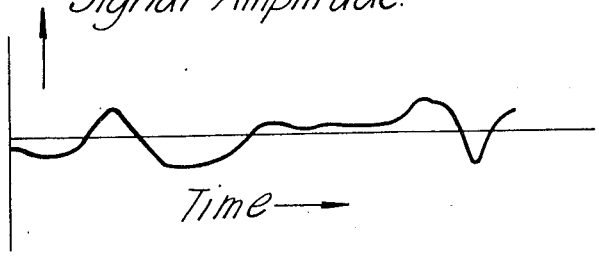
FIG. 8 is a representation of a waveform used for the purpose of illustrating differences between the embodiments of FIGS. 6 and 7.

The apparatus shown in FIG. 7, in common with the embodiments of FIGS. 1 and 6 feeds a profile signal through a phase sensitive detector and low and high pass filters. The mean amplitude is derived, as in the embodiment of FIG. 6 by means of a full-wave rectifier and an integrator and store 13. In this apparatus, however, increments of $f(x)$ are set up as equally spaced voltage levels in reference level generator 20, each level being associated with a crossings detector 22. The crossings detectors emit trigger pulses as intercepts of voltage levels are registered and, as time is proportional to distance, slope becomes represented as trigger pulses per unit time. In FIG. 8 reference levels are superimposed on the plot of signal against time. When the signal slope is large, trigger pulses occur at a fast rate, and conversely, at a slow rate when the signal slope is small.

In order to obtain the mean slope the pulse rate must be integrated and stored, and this is conveniently effected by counting the trigger pulses in counter 23.

For reasons of economy the reference voltage levels are not chosen arbitrarily. The instrument measures the parameter $\overline{|f(x)|}$ and in determining the scale range for this purpose, a related set of reference voltage levels extending to approximately 3 $\overline{|f(x)|}$ are set up by means of the range switch 21.

Divider 15 is of a hybrid analogue/digital form comprising a "see-saw" amplifier with input resistor $R$ and has an output proportional to $1/RG$ where $G$ is the conductance of the network 24. This latter comprises separate weighting resistances controlled by digital switching from the counter 23. The output of the divider amplifier is a measure of average wavelength and is indicated by a meter 16 with linear scales.

The mean modulus of the amplitude may be indicated in the usual way by a meter 10 also with a linear scale. The average slope may be indicated by a meter, 14, which is conveniently switched to the amplifier and weighting resistance network reorganized as a digital-analogue converter for this purpose by switching internal connections. Alternatively the counter may be used to drive a numerical readout of average slope.

From computation of the power spectrum and correlation functions of a large number of practical machined surfaces, many surfaces may be classified into two categories; first order random and second order random. For instance abraded and ground surfaces tend to have a white noise spectrum limited at the high frequencies by a drop off of about 6dB/octave whereas surfaces produced by many single tooth machining processes have a sharp peak in the spectrum on a broad random base which tails off at high frequencies - typical in fact of a second order random process. The way in which this sort of surface differs from the periodic is in the shape of the amplitude distribution. For the second order random waveform it tends to be Gaussian whereas it is not for the periodic waves. Single tooth machined surfaces can usually be classified somewhere in between the second order random and the periodic.

Difficulties are experienced when attempting to measure the average wavelength index of certain profiles, such as square edges which produce waveforms rich in harmonics. It has been found in practice that a significant value cannot be obtained unless the high frequency components fall off at a rate exceeding 6dB/octave, and it is to ensure that this condition applies that the low pass filter 7 has been included in the circuits of the embodiments described.

Filtering is also necessary in practical instruments to remove vibration and extraneous noise, and from theoretical considerations it has been found that the optimum turnover frequency is approximately 50 – 100 times that of the low pass filter and, since the average wavelength index is not critically dependent on the value of the high frequency turnover a bandwidth of 100 is conveniently chosen.

Whilst embodiments of the invention relating to the study of profiles of surfaces have been described, it will be apparent to those skilled in the art that it is not limited to such applications and that modifications of the method and apparatus can be applied to the assessment of the relationship between any two interdependent variables. In general the method will find application where it is desired with simple instrumentation to obtain a means of comparing the power spectra of sets of inter-related variables.

What is claimed is:

1. Apparatus for characterizing the spectrum of a dependent variable with respect to an independent variable, said apparatus comprising:
   means determining the value of said dependent variable over a range of values of said independent variable,
   means providing a first signal representing the mean modulus of said dependent variable over said range,
   means providing a second signal representing the mean modulus of the rate of change of said dependent variable with respect to said independent variable over said range, and
   modifying means for modifying one of said first and second signals by means of the other of said first and second signals to provide a third signal representing an average wavelength parameter characterizing said spectrum.

2. The apparatus of claim 1, wherein said means providing said second signal representing the mean modulus of said rate of change of said dependent variable with respect to said independent variable comprises a rectifier feeding an integrator and fed with a signal representing the rate of change of said dependent variable with respect to said independent variable.

3. The apparatus of claim 2 wherein said second signal is obtained at the output of a differentiation circuit fed with said signal representing said value of said dependent variable.

4. The apparatus of claim 1, wherein said parameter to be determined characterizes the profile of a surface of a body,
   said apparatus further comprising means for determining the distance of said surface from a reference line, thereby to provide a signal representing said dependent variable over a range of positions spaced over said surface.

5. The apparatus of claim 4 further comprising
   a probe movable with respect to said surface along a line in contact with said surface and responsive to changes in said profile of said surface to produce a signal in dependence thereon,
   said probe comprising said means determining said distance of said surface from said reference line.

6. The apparatus of claim 5 wherein said probe is a transducer operable at a modulation frequency, and further comprising:
   a carrier oscillator from which said transducer is fed, said carrier oscillator determining the modulation frequency,
   means for demodulating said signal from said transducer, and
   means for removing the low frequency component of said demodulated signal.

7. The apparatus of claim 6, further comprising means for removing any components of said demodulated signal having a frequency greater than about 6 octaves above the lowest frequency passed by said means for removing said low frequency component of said demodulated signal.

8. The apparatus of claim 5 further comprising
   means for rectifying and integrating said demodulated signal,
   means for differentiating said demodulated signal, and
   means for rectifying and integrating said differentiated signal to provide respectively a first signal representing said mean modulus of the distance of said surface of said profile from said reference line and a second signal representing the mean modulus of the rate of change of said distance of said surface from said reference line.

9. The apparatus of claim 8 further comprising a divider circuit for producing an output signal representing the division of said first signal representing said mean modulus of the distance of said surface from said reference line by said second signal representing said mean modulus of the rate of change of the distance of said surface from said reference line.

10. The apparatus of claim 8 wherein said means for rectifying said demodulated signal are full wave rectifiers.

11. The apparatus of claim 5 further comprising
    means for rectifying and integrating said demodulated signal,
    means for generating a plurality of reference signals representing a series of attainable values of said demodulated signal,
    means for detecting the crossing by said demodulated signal of said reference value to produce an output pulse in dependence thereon, and means for counting said pulses produced by said detector, thereby to produce a numerical representation of the rate of change of said distance of said surface from said reference line.

12. The apparatus of claim 5 further comprising:
means for rectifying and integrating said demodulated signal,
means for generating a plurality of reference signals representing a series of attainable values of said demodulated signal,
means for detecting the crossing by said demodulated signal of said reference value to produce an output pulse in dependence thereon, and
means for counting said pulses produced by said detector to produce a numerical representation of the rate of change of said distance of said surface from said surface line.

13. The apparatus of claim 4 comprising means for displaying said first and second signals respectively representing said mean modulus of said distance of said surface from said reference line, said mean modulus of said rate of change of said distance of said surface from said reference line, and said signal representing said parameter determined by said combination of said two signals.

14. Apparatus according to claim 1 wherein said modifying means comprises means for modifying the first signal by means of the second signal to provide the third signal, said third signal directly representing said average wavelength parameter.

15. The apparatus of claim 14 wherein said modifying means modifying said first signal by means of said second signal is a divider circuit in which said first signal is divisible by said second signal.

16. Apparatus according to claim 1 wherein said modifying means comprises means for modifying the second signal by means of the first signal to provide the third signal, the third signal representing the reciprocal of said average wavelength parameter.

17. The apparatus of claim 16 wherein said modifying means modifying said second signal by means of said first signal is a divider circuit in which said second signal is divisible by said first signal.

18. Apparatus for characterizing the spectrum of a dependent variable with respect to an independent variable, said apparatus comprising:
means determining the value of said dependent variable over a range of values of said independent variable,
means providing a first signal representing the root mean square of said dependent variable over said range,
means providing a second signal representing the root mean square of the rate of change of said dependent variable with respect to said independent variable over said range, and
modifying means for modifying one of said first and second signals by means of the other of said first and second signals to provide a third signal representing a roof mean square wavelength parameter characterizing said spectrum.

19. Apparatus according to claim 18 wherein said modifying means comprises means for modifying the first signal by means of the second signal to provide the third signal, said third signal directly representing said root mean square wavelength parameter.

20. The apparatus of claim 19 wherein said modifying means modifying said first signal by means of said second signal is a divider circuit in which said first signal is divisible by said second signal.

21. Apparatus according to claim 18 wherein said modifying means comprises means for modifying the second signal by means of the first signal to provide the third signal, the third signal representing the reciprocal of said root mean square wavelength parameter.

22. The apparatus of claim 11 wherein said modifying means modifying said second signal by means of said first signal is a divider circuit in which said second signal is divisible by said first signal.

23. The apparatus of claim 18 wherein said means providing said second signal representing the root mean square of said rate of change of said dependent variable with respect to said independent variable comprises a rectifier feeding an integrator and fed from a differentiation circuit with a signal representing the rate of change of said dependent variable with respect to said independent variable.

24. The apparatus of claim 23 wherein said signal representing said rate of change of said dependent variable with respect to said independent variable is obtained at the output of the differentiation circuit fed with said signal representing said value of said dependent variable.

25. The apparatus of claim 18 wherein said parameter to be determined characterizes the profile of a surface of a body
said apparatus including means for determining the distance of said surface from a reference line, thereby to provide a signal representing said dependent variable over a range of positions spaced over said surface.

26. The apparatus of claim 25 further comprising:
a probe movable with respect to said surface along a line in contact with said surface and responsive to changes in said profile of said surface to produce a signal in dependence thereon,
said probe comprising said means determining said distance of said surface from said reference line.

27. The apparatus of claim 26 wherein said probe is a transducer operable at a modulation frequency, and further comprising:
a carrier oscillator from which said transducer is fed, said carrier oscillator determining said modulation frequency,
means for demodulating said signal from said transducer, and
means for removing any low frequency component of said demodulated signal.

28. The apparatus of claim 27, further comprising means for removing the components of said demodulated signal having a frequency greater than about 6 octaves above the lowest frequency passed by said means for removing said low frequency component of said demodulated signal.

29. The apparatus of claim 26 further comprising:
means for rectifying and integrating said demodulated signal,
means for differentiating said demodulated signal, and
means for rectifying and integrating said differentiated signal to provide respectively a first signal representing said root mean square of the distance of said surface of said profile from said reference line and a second signal representing the root mean square of the rate of change of said distance of said surface from said reference line.

30. The apparatus of claim 29 further comprising a divider circuit for producing an output signal representing the division of said first signal representing said root mean square of the distance of said surface from said reference line by said second signal representing said root mean square of the rate of change of the distance of said surface from said reference line.

31. The apparatus of claim 29 wherein said means for rectifying said demodulated signal are square law rectifiers.

32. The apparatus of claim 25 further comprising means for displaying said first and second signals respectively representing said root mean square of said distance of said surface from said reference line, said root mean square of said rate of change of said distance of said surface from said reference line, and said signal representing said parameter determined by said combination of said two signals.

33. A method of characterizing the spectrum of a dependent variable with respect to an independent variable comprising the steps of:
  determining the value of said dependent variable over a range of values of said independent variable,
  deriving a first signal representing the mean modulus of said dependent variable over said range,
  deriving a second signal representing the mean modulus of the rate of change of said dependent variable with respect to said independent variable over said range, and
  modifying one of said first and second signals by means of the other of said first and second signals to provide a third signal representing an average wavelength parameter characterizing said spectrum.

34. The method of claim 33 wherein said first signal representing said mean modulus of the rate of change of said dependent variable over said range is derived from a signal representing the value of said rate of change of said dependent variable which in turn is derived by differentiation of a signal representing the value of said dependent variable over said range.

35. The method of claim 33 wherein said parameter to be determined characterizes the profile of a surface of a body, said dependent variable being the distance of said surface of said body from a reference line and said independent variable being distance along said surface from a predetermined point.

36. The method of claim 35 wherein said signal representing the value of said dependent variable is obtained by passing a probe in contact with said surface along a predetermined line to obtain a signal representing the distance of said surface from a reference line.

37. The method of claim 36 wherein a signal representing said rate of change of said dependent variable is obtained by differentiation of said signal representing the distance of said surface from said reference line and is used to provide said first signal representing said mean modulus of said rate of change of said distance of said surface from said reference line.

38. The method of claim 35, wherein said parameter determined is the rate of said mean modulus of distance of said surface from said reference line to said mean modulus of said rate of change of said distance of said surface from said reference line.

39. A method according to claim 33 wherein the step of modifying comprises modifying the first signal by means of the second signal to provide the third signal, said third signal directly representing said average wavelength parameter.

40. The method of claim 39 wherein said first signal is divided by said second signal to provide said third signal representing the average wavelength parameter characterizing said spectrum.

41. A method according to claim 33 wherein the step of modifying comprises modifying the second signal by means of the first signal to provide the third signal, the third signal representing the reciprocal of said average wavelength parameter.

42. The method of claim 41 wherein said second signal is divided by said first signal to provide said signal representing the reciprocal of the average wavelength parameter characterizing said spectrum.

43. A method of characterizing the spectrum of a dependent variable with respect to an independent variable comprising the steps of:
  determining the value of said dependent variable over a range of values of said independent variable,
  deriving a first signal representing the root mean square of said dependent variable over said range,
  deriving a second signal representing the root mean square of the rate of change of said dependent variable with respect to said independent variable over said range, and
  modifying one of said first and second signals by means of the other of said first and second signals to provide a third signal representing a root mean square wavelength parameter characterizing said spectrum.

44. A method according to claim 43 wherein the step of modifying comprises modifying the first signal by means of the second signal to provide the third signal, said third signal directly representing said root mean square wavelength parameter.

45. The method of claim 44 wherein said first signal is divided by said second signal to provide said third signal representing the root mean square wavelength parameter characterizing said spectrum.

46. A method according to claim 43 wherein the step of modifying comprises modifying the second signal by means of the first signal to provide the third signal, the third signal representing the reciprocal of said root mean square parameter wavelength.

47. The method of claim 46 wherein said second signal is divided by said first signal to provide said third signal representing the reciprocal of the root mean square wavelength parameter characterizing said spectrum.

48. The method of claim 43 wherein said first signal representing said root mean square of the rate of change of said dependent variable over said range is derived from a signal representing the value of said rate of change of said dependent variable which is derived by differentiation of a signal representing the value of said dependent variable over said range.

49. The method of claim 43 wherein said parameter to be determined characterizes the profile of a surface of a body, said dependent variable being the distance of said surface of said body from a reference line and said independent variable being distance along said surface from a predetermined point.

50. The method of claim 49 wherein said signal representing the value of said dependent variable is obtained by passing a probe in contact with said surface along a predetermined line to obtain a signal representing the difference of said surface from a reference line.

51. The method of claim 50 wherein a signal representing said rate of change of said dependent variable is obtained by differentiation of said signal representing the distance of said surface from said reference line and used to provide said first signal representing said root mean square of said rate of change of said distance of said surface from said reference line.

52. The method of claim 49 wherein said parameter determined is the ratio of said root mean square of distance of said surface from said reference line to said root mean square of said rate of change of said distance of said surface from said reference line.

* * * * *